A. WALKER.

Potato Digger.

No. 58,560.

Patented Oct. 2, 1866.

Witnesses:
Geo. D. Walker
Chas H. Smith

Inventor:
A. Walker
per L. W. Senell
Atty.

UNITED STATES PATENT OFFICE.

ANDREW WALKER, OF CLAREMONT, ASSIGNOR TO HIMSELF, J. P. UPHAM, OF SAME PLACE, AND C. EASTMAN, OF CONWAY, CARROLL COUNTY, NEW HAMPSHIRE.

IMPROVEMENT IN POTATO-DIGGERS.

Specification forming part of Letters Patent No. 58,560, dated October 2, 1866.

*To all whom it may concern:*

Be it known that I, ANDREW WALKER, of Claremont, in the county of Sullivan and State of New Hampshire, have invented and made a certain new and useful Improvement in Potato-Diggers; and I do hereby declare the following to be a full, clear, and exact description of the said invention, reference being had to the annexed drawings, making part of this specification, wherein—

Figure 1:
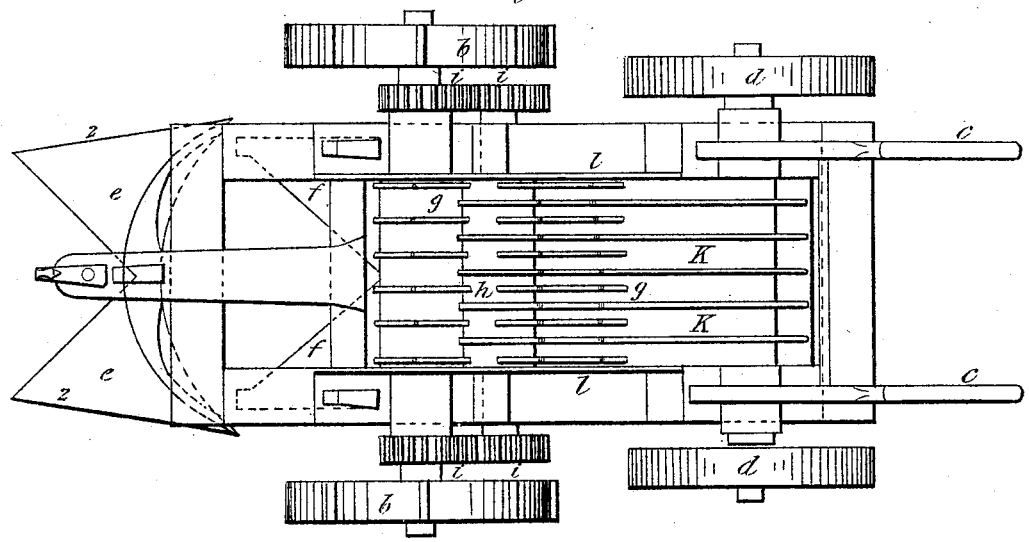
Figure 2:
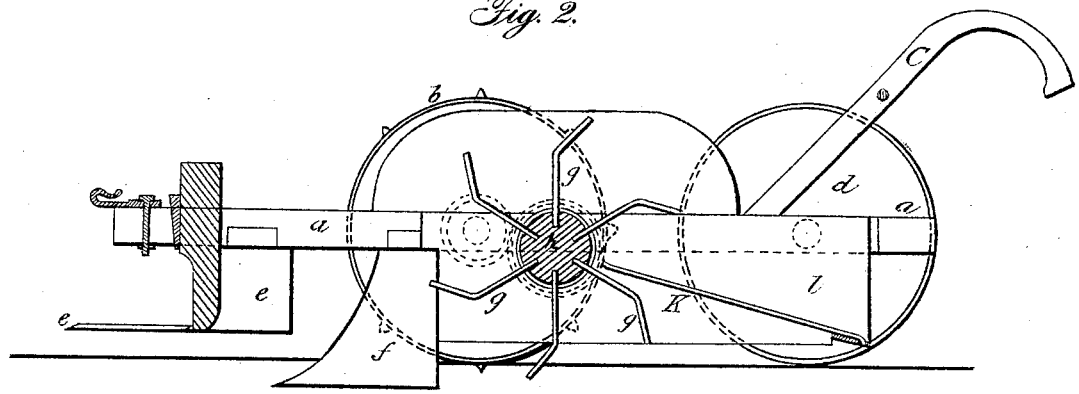

Figure 1 is a plan of said potato-digger, and Fig. 2 is a longitudinal section of the same.

Similar marks of reference denote the same parts.

Potatoes have heretofore been raised by a plow, and separated by a revolving cylinder of teeth that throws the potatoes over to the rear; but they fall with the earth, and become more or less mixed with and covered by the earth and vines.

The nature of my said invention consists in an inclined cutter that first removes the weeds and vines from the line of the row of potatoes, and then a mold-board or plow raises the potatoes in a furrow-slice that is separated by a series of revolving prongs that deliver the potatoes upon an inclined screen, and the earth, sifting through the same, leaves the tubers upon the surface, where they can be easily gathered up, or may be automatically gathered by using a box at the rear of said screen, or any other character of receptacle or gatherer.

In the drawings, $a$ is a frame-work supported upon the wheels $b$ that run in the furrows between the rows of potatoes, and said frame-work and parts carried by it may be drawn by any suitable power and guided by handles $c$, or a seat may be provided for a driver, and wheels $d$ employed to sustain the back end of the frame $a$.

$e$ is a cutter to remove the vines and weeds. This is attached to the frame $a$ by a vertical standard passing through a mortise in which is a wedge or other clamping device for holding the same securely, but allowing of an adjustment to suit the height of the row. The cutter $e$ is made with converging cutting-edges that gather the stems, and then cut them off as they approach the apex of the cutting-edges, and the portion 2, that is made something in the form of a snow-plow or a double mold-board, throws the vines and weeds off into the furrows.

The plows $f f$ are sustained by standards passing through mortises in the frame $a$, and are adjustable in height so as to determine the depth of cut, and the furrow-slice that is raised by these plows is acted upon by the prongs $g g$ of a revolving separator.

The prongs $g g$ are set in a cylinder, $h$, sustained in the frame $a$ and revolved by the wheels $i i$ in the opposite direction to the supporting and driving wheels $b b$, so that the prongs throw the potatoes over upon the inclined screen $k$. This operation separates the earth and tubers, and this is still more perfectly accomplished as the potatoes slide or roll down the screen $k$, by which they are delivered upon the top of the earth or into any suitable receptacle.

The side pieces, $l$, projecting above and below the frame $a$ at both ends of the cylinder $h$, and sides of the screen $k$, confine the earth and potatoes and prevent their being scattered by the prongs $g$.

What I claim, and desire to secure by Letters Patent, is—

The combination of the cutter $e$, plows $f$, and cylinder-prongs $g$ with the grate or screen $k$ and mechanism for actuating said cylinder, substantially as specified.

In witness whereof I have hereunto set my signature this 13th day of August, 1866.

ANDREW WALKER.

Witnesses:
N. W. PARKER,
SIMEON IDE.